United States Patent
Ishii

(10) Patent No.: US 7,136,989 B2
(45) Date of Patent: Nov. 14, 2006

(54) PARALLEL COMPUTATION PROCESSOR, PARALLEL COMPUTATION CONTROL METHOD AND PROGRAM THEREOF

(75) Inventor: Daiji Ishii, Tokyo (JP)

(73) Assignee: NEC Corporation, Tokyo (JP)

( * ) Notice: Subject to any disclaimer, the term of this patent is extended or adjusted under 35 U.S.C. 154(b) by 622 days.

(21) Appl. No.: 10/254,543

(22) Filed: Sep. 26, 2002

(65) Prior Publication Data

US 2003/0065905 A1    Apr. 3, 2003

(30) Foreign Application Priority Data

Oct. 1, 2001    (JP) ............................. 2001-305786

(51) Int. Cl.
  *G06F 9/38* (2006.01)
  *G06F 9/40* (2006.01)
(52) U.S. Cl. ........................ 712/23; 712/241
(58) Field of Classification Search ................. 712/23, 712/212, 241, 24
  See application file for complete search history.

(56) References Cited

U.S. PATENT DOCUMENTS 5,333,280 A * 7/1994 Ishikawa et al. ............ 712/241
6,014,741 A * 1/2000 Mahalingaiah ............... 712/233
6,032,252 A * 2/2000 Petro et al. .................. 712/233
6,425,069 B1 * 7/2002 Thatcher et al. .............. 712/24
6,490,673 B1 * 12/2002 Heishi et al. ................ 712/213
6,598,155 B1 * 7/2003 Ganapathy et al. .......... 712/241
6,671,799 B1 * 12/2003 Parthasarathy ............... 712/241

FOREIGN PATENT DOCUMENTS

JP    7-110769 A    4/1995

* cited by examiner

*Primary Examiner*—Eric Coleman
(74) *Attorney, Agent, or Firm*—Sughrue Mion, PLLC

(57) ABSTRACT

A parallel computation processor being capable of high-speed loop operation. When instruction decoders decode the VLOOP instruction, which triggers loop operation, an instruction buffer starts storing normal instructions. The instruction buffer dispatches a VLIW instruction composed of n pieces of normal instructions to execution units each time n pieces of instructions are stored therein. The execution units concurrently execute the instructions. After all instructions comprised in a loop have been stored in the buffer and once dispatched as VLIW instructions to be executed, the loop is executed repeatedly.

4 Claims, 6 Drawing Sheets

US 7,136,989 B2

PARALLEL COMPUTATION PROCESSOR, PARALLEL COMPUTATION CONTROL METHOD AND PROGRAM THEREOF

FIELD OF THE INVENTION

The present invention relates to a parallel computation processor, a parallel computation control method and a program thereof and, more particularly, to a parallel computation processor that enables high-speed loop operation with little power consumption, a computation control method adopted in the same and a program thereof.

BACKGROUND OF THE INVENTION

A DSP (digital signal processor) is among major parallel computation processors. The DSP operates plural execution units in parallel by taking advantage of a characteristic of digital signal processing, "parallel operation", to execute a digital signal processing program at a high speed.

For example, the FIR filter (finite impulse response filter), which is a typical program for the digital signal processing, carries out computation as follows:

$$y(n) = a(0) \times x(n) + a(1) \times x(n-1) + a(2) \times x(n-2) + \ldots + a(i) \times (n-i) \quad (1)$$

Incidentally, y(n) denotes filter output at time n, s(n−i) denotes filter input at time n−i, and a(i) denotes i-th filter coefficient. The computation represents a loop of the following three steps (①, ②, and ③) with respect to i=0, 1, 2, 3:

①: loading a(i) from a memory;
②: loading x(n−i) from a memory;
③: multiplying a(i) and x(n−i) together, and accumulating the product.

Accordingly, the DSP in general is provided with a couple of units for loading data from a memory and a unit for executing the multiplication and accumulation. These units are operated in parallel for simultaneously carrying out the steps ①, ②, and ③, and thus enabling high-speed computation of expression (1).

It is expected that the number of units built in the DSP will be increasing in future. However, the processor requires larger amount of power as computer resources increase. In order to reduce power consumption, it is necessary to limit the computer resources such as a bus for memory access to a minimum except for execution units.

For the purpose of reducing power consumption, there has been proposed a parallel computation processor as depicted in FIG. 1. In the processor, computer resources for instruction issue are reduced by means of cutting down on the number of simultaneously issued instructions compared to the number of execution units.

With reference to FIG. 1 showing the configuration of the conventional parallel computation processor, the processor is equipped with a feature that enables the parallel issue of up to m pieces of instructions. The number m is less than the number of execution units denoted by n. More specifically, the parallel computation processor comprises an instruction bus 201 for simultaneously fetching m pieces of instructions from a memory, m pieces of instruction registers 202 (IR1 to IRm) for storing the instructions, m instruction decoders 203 (ID1 to IDm) for concurrently decoding the m pieces of instructions read out of the registers 202, an instruction dispatcher 204 for simultaneously dispatching decoded instructions obtained by the decoders 203, n execution units 205 (E1 to En) for executing the instructions in parallel, and a general register file 206 for feeding input data to the execution units 205 as well as storing outputs therefrom. Incidentally, the instruction dispatcher 204 determines the number of instructions to dispatch in parallel according to the mutual data dependency of instructions. The number may be any one of numbers 1 to m.

The parallel computation processor operates as follows. First, the instruction bus 201 fetches m pieces of instructions from an instruction memory at once, and writes the instructions to the instruction resisters 202. Subsequently, the instruction decoders 203 concurrently decode the m pieces of instructions read out of the resisters 202, and feed m pieces of decoding results to the instruction dispatcher 204. The instruction dispatcher 204 determines the number (a number between 1 and m) of instructions to dispatch in parallel based on dependency among the instructions, and simultaneously dispatches the determined number of instructions. The instructions are executed by any of the n pieces of execution units 205.

The parallel computation processor is available to execute such programs as have many branches that place difficulties in the parallel operation and control operations described by IF-ELSE statements, etc. However, as is clear from the fact that the number of the dispatched instructions does not correspond to the number of the execution units, the processor does not give a performance commensurate with the number of its execution units.

To solve the problem, for example, there has been disclosed a parallel computation processor in Japanese Patent Application laid open No. HEI7-110769. The parallel computation processor is known for having greater computational performance by means of dispatching instructions equal in number to execution units. The processor fetches instructions via an instruction bus while leaving the bandwidth of the bus narrow, and stores the instructions in a buffer to execute instructions of the same number as execution units in parallel.

Incidentally, in the case where the DSP is employed as a parallel computation processor for digital signal processing, it is required to execute high-speed loop operation, in which a series of instructions are executed repeatedly, as the loop operation is typical of a digital signal processing program. In order to implement the high-speed loop operation, there have been employed such techniques as zero-overhead loop. The zero-overhead loop is a control method for cutting out overhead due to execution of a branch instruction. In the zero-overhead loop, specifying instructions are inserted in the beginning of a series of instruction modules comprised in a loop to specify the number of steps in the loop and loop repeat count, namely, count of how many times the loop will be repeated. When the last step in the loop has been executed, execution sequence automatically returns to the address of the first step in the loop, thus enabling the elimination of overhead due to branches.

However, the above-mentioned parallel computation processor does not aim to execute the loop operation efficiently, and therefore structurally incurs overhead on the occasion of branching from the instruction at the loop end to the one at the beginning in execution sequence.

SUMMARY OF THE INVENTION

It is therefore an object of the present invention to provide a parallel computation processor that enables high-speed loop operation with little power consumption by means of dispatching instructions equal in number to execution units, a computation control method employed in the same and a program thereof.

In accordance with the first aspect of the present invention, to achieve the above objects, there is provided a parallel computation processor comprising: an instruction bus for simultaneously fetching m (in: an arbitrary natural number) pieces of instructions from an instruction memory; instruction registers for storing the instructions; instruction decoders for concurrently decoding the instructions read out of the registers; an instruction dispatcher for simultaneously dispatching the m pieces of instructions decoded by the decoders; an instruction buffer for storing plurality of decoded instructions, and simultaneously dispatching n (n: an arbitrary natural number larger than in) pieces of decoded instructions; a loop control unit for controlling execution sequence in loop operation and instruction storing/dispatching carried out in the buffer; multiplexers for selecting either the instructions dispatched by the dispatcher or the instructions dispatched by the buffer under the control of the control unit; and n pieces of execution units for executing a plurality of instructions in parallel.

In accordance with the second aspect of the present invention, the loop control unit is in control of operations including: initiating storing of instructions in the instruction buffer by decoding an instruction that declares the start of loop operation; dispatching n pieces of instructions in parallel each time n pieces of instructions are stored in the buffer; and repeating the parallel dispatch of the instructions stored in the buffer during repetitive loop operation after all instructions comprised in a loop have been stored in the buffer.

In accordance with the third aspect of the present invention, there is provided a computation control method used in a parallel computation processor which decodes m (m: an arbitrary natural number) pieces of instructions simultaneously read out of an instruction memory and dispatches the instructions via an instruction dispatcher in parallel to execute operations specified by the instructions by any of n (n: an arbitrary natural number larger than m) pieces of execution units, comprising the steps of initiating storing of decoded instructions in an instruction buffer by decoding an instruction that declares the start of loop operation; dispatching n pieces of instructions in parallel each time n pieces of instructions are stored in the buffer; concurrently executing operations specified by the instructions by n pieces of the execution units; and repeating the parallel dispatch of the instructions stored in the buffer during repetitive loop operation after all instructions comprised in a loop have been stored in the buffer.

In accordance with the fourth aspect of the present invention, there is provided a computation control program for a parallel computation processor which decodes m (m: an arbitrary natural number) pieces of instructions simultaneously read out of an instruction memory and dispatches the instructions via an instruction dispatcher in parallel to execute operations specified by the instructions by any of n (n: an arbitrary natural number larger than m) pieces of execution units, controlling the operations of: initiating storing of decoded instructions in an instruction buffer by decoding an instruction that declares the start of loop operation; dispatching n pieces of instructions in parallel each time n pieces of instructions are stored in the buffer; concurrently executing operations specified by the instructions by n pieces of the execution units; and repeating the parallel dispatch of the instructions stored in the buffer during repetitive loop operation after all instructions comprised in a loop have been stored in the buffer.

As is described above, the parallel computation processor of the present invention is provided with the loop control unit (106 in FIG. 2) that is in control of processor's performing operations of: initiating storing of instructions in the instruction buffer (105 in FIG. 2) by decoding an instruction that declares the start of loop operation; dispatching stored instructions in parallel each time instructions of the same number as the built-in execution units are stored in the buffer; and repeating the parallel dispatch of the instructions stored in the buffer when all instructions comprised in a loop have been stored in the buffer.

Accordingly, the parallel computation processor is capable of parallel execution of instructions using all the execution units thereon in the loop operation. In addition, the parallel computation processor includes a means of controlling execution sequence in the loop operation with little overhead, thus enabling high-speed loop operation.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

Figure 1:
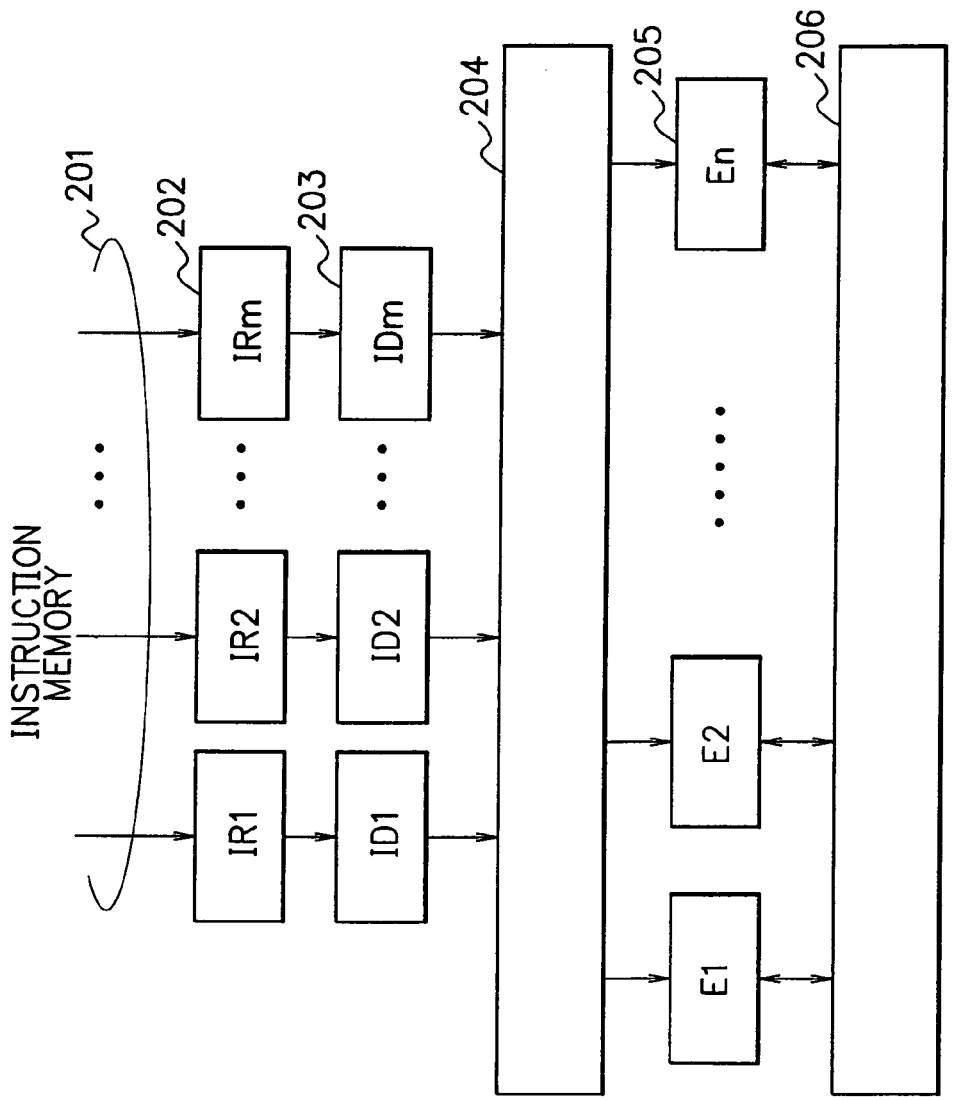
FIG. 1 is a block diagram showing the configuration of a conventional parallel computation processor.

Referring now to the drawings, a description of a preferred embodiment of the present invention will be given in detail.

Figure 2:
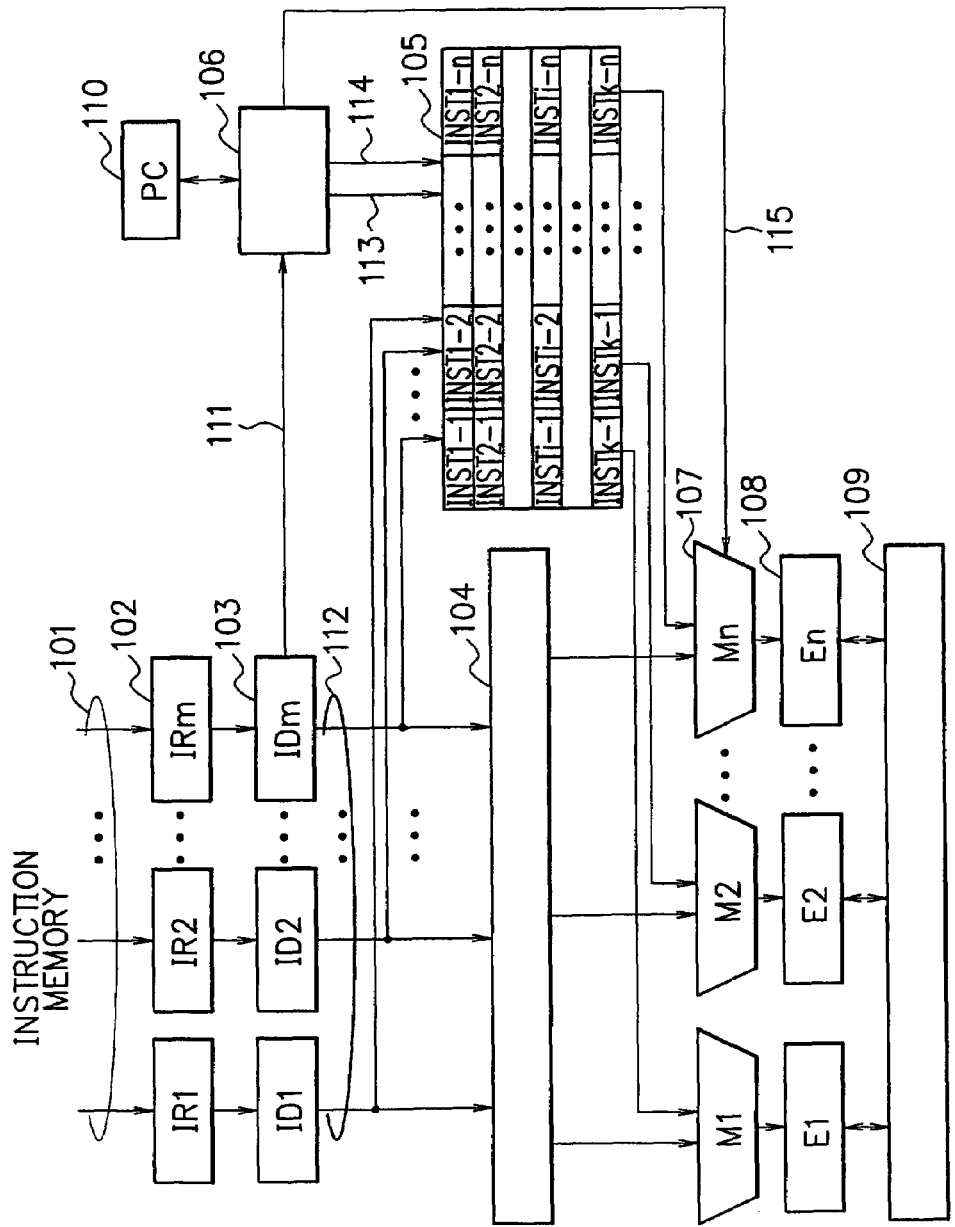
FIG. 2 is a block diagram showing the configuration of a parallel computation processor according to an embodiment of the present invention.
Figure 3:
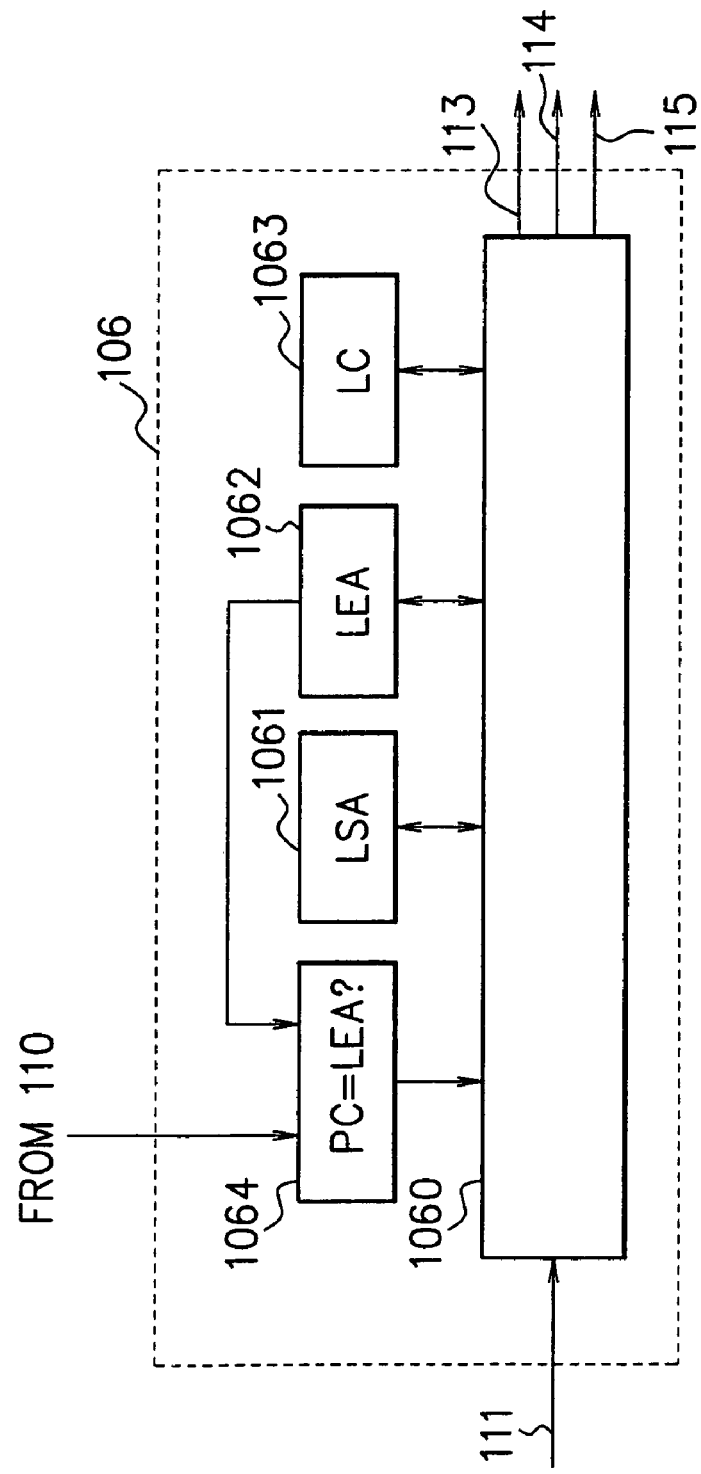
FIG. 3 is a block diagram showing the configuration of a loop control unit depicted in FIG. 2.

FIG. 2 is a block diagram showing the configuration of a parallel computation processor according to an embodiment of the present invention. The processor is equipped with a feature for selectively executing either normal instructions or concatenated instructions consisting of the normal instructions equal in number to n pieces of execution units (hereinafter referred to as VLIW instructions) according to modes. With reference to FIG. 2, the parallel computation processor comprises: an instruction bus 101 for simultaneously fetching m pieces of the normal instructions from an instruction memory; m pieces of instruction registers 102 (IR1 to IRm) for storing the normal instructions; m pieces of instruction decoders 103 (ID1 to IDm) for concurrently decoding the m pieces of normal instructions read out of the registers 102; an instruction dispatcher 104 for simultaneously dispatching determined number (a number between 1 and m) of decoded instructions obtained by the decoders 103; an instruction buffer 105 for sequentially storing m pieces of the decoded instructions 112 obtained by the decoders 103 to form a VLIW instruction composed of n (n: an integral multiple of m) pieces of the normal instructions, and storing a VLIW routine composed of plural VLIW instructions; a loop control unit 106 for controlling instruction storage!dispatch and execution sequence in loop operation; n pieces of multiplexers 107 (M1 to Mn) for selecting either the normal instructions dispatched from the dispatcher 104 or the VLIW instruction dispatched from the buffer 105; n pieces of execution units 108 (E1 to En) for executing the normal instructions or the VLIW instruction; a general register file 109 for feeding input data to the execution units 108 as well as storing outputs therefrom; and a program counter (PC) 110 for storing instruction address, and counting the number of dispatched instructions. Incidentally, in the loop operation of the processor, one VLIW routine is executed repeatedly. Besides, the loop operation is initiated by decoding the "VLOOP" instruction for declaring the start of loop operation, which is described in a program by a user.

The VLOOP instruction specifies the number of VLIW instructions in a VLIW routine (VNUM) and repeat count (VLC).

The instruction bus 101 is connected to the instruction memory, and simultaneously transfers m pieces of normal instructions therefrom.

The instruction registers 102 (IR1 to IRm) receive the m pieces of normal instructions fetched via the instruction bus 101, respectively, and output the normal instructions to the instruction decoders 103 in the next cycle.

The instruction decoders 103 (ID1 to IDm) receive the m pieces of normal instructions outputted from the instruction registers 102, respectively, to decode the instructions, and output decoded instructions 112 to the instruction dispatcher 104 and the instruction buffer 105. The instruction decoders 103 also output a VLOOP decode signal 111 indicating that the VLOOP instruction has been decoded.

The instruction dispatcher 104 receives the m pieces of decoded instructions 112 obtained by the instruction decoders 103. The instruction dispatcher 104 subsequently determines the number of instructions to dispatch in parallel (a number between 1 and m is selected) based on mutual data dependence of the instructions, and outputs the determined number of decoded instructions to the multiplexers 107.

The instruction buffer 105 receives the decoded instructions 112 from the instruction decoders 103, a write enable signal 113 for permitting the decoded instructions 112 to be written, and a read selection signal 114 for selecting a VLIW instruction to dispatch. The instruction buffer 105 selects a VLIW instruction composed of n pieces of decoded instructions from the VLIW routine stored therein according to the read selection signal 114, and outputs the VLIW instruction to the multiplexers 107.

The loop control unit 106 receives the number counted by the PC 110 and the VLOOP decode signal 111, and outputs the write enable signal 113, read selection signal 114, and a dispatch selection signal 115 for switching from the instruction dispatcher 104 to the instruction buffer 105 or vice versa to dispatch instructions. The loop control unit 106 includes: a loop control section 1060 for controlling instruction storage/dispatch and execution sequence in loop operation; a register 1061 for storing the address (LSA) of the first VLIW instruction in a VLIW routine; a register 1062 for storing the address (LEA) of the last VLIW instruction in the VLIW routine; a register 1063 for counting down the repeat count of loop operation; and a comparator 1064 for detecting whether or not the instruction address stored in the PC 110 corresponds to the LEA stored in the register 1062 (LEA 1062). Additionally, the address next to the address of the VLOOP instruction is assigned for the LSA 1061; LSA+ VNUM×n (the address of the first VLIW instruction in a VLIW routine+the number of VLIW instructions×n) is assigned for the LEA 1062; VLC (repeat count) is assigned for the LC 1063.

The multiplexers 107 (M1 to Mn) receive the decoded normal instructions dispatched from the instruction dispatcher 104 and the VLIW instruction composed of n pieces of decoded normal instructions from the instruction buffer 105. The multiplexers 107 selectively output either the normal instructions or the VLIW instruction based on the dispatch selection signal 115 received from the loop control unit 106.

The execution units 108 (E1 to En) receive the outputs of the multiplexers 107 as control signals for each of them as well as input data to be processed by the normal instructions or the VLIW instruction from the general register file 109. The execution units 108 each output the result of execution to the general register file 109.

The general register file 109 outputs the input data to be processed at the execution units 108, and receives the outputs of the units 108.

The PC 110 stores instruction address. The PC 110 also counts the number of instructions dispatched from the instruction dispatcher 104 or instruction buffer 105. For example, when i pieces of normal instructions are dispatched, the count is incremented by i. On the other hand, when a VLIW instruction is dispatched, the count is incremented by n.

The VLOOP decode signal 111 is asserted when the VLOOP instruction is decoded by the instruction decoders 103. Otherwise, the signal 111 is negated.

The write enable signal 113 is asserted when the loop control unit 106 accepts the writing of data. When the loop control unit 106 rejects the writing, the signal 113 is negated.

The dispatch selection signal 115 is asserted when the loop control unit 106 has determined to dispatch the VLIW instruction outputted from the instruction buffer 105. When the loop control unit 106 has determined to dispatch the normal instructions outputted from the instruction dispatcher 104, the signal 115 is negated.

Next, the operation of the parallel computation processor according to the embodiment of the present invention will be explained. The parallel computation processor of the present invention is provided with three operation modes: normal mode, initial VLOOP mode, and VLOOP mode. In the normal mode, the normal instructions dispatched from the instruction dispatcher 104 are executed in parallel. When the VLOOP instruction is decoded during the normal mode, the processor enters the initial VLOOP mode to start loop operation. In the initial VLOOP mode, a VLIW routine is executed once as initial loop operation. After that, the processor enters the VLOOP mode. In the VLOOP mode, the VLIW routine is executed repeatedly until the loop operation is completed.

In the following, each of the modes will be described in detail with reference to FIGS. 4 to 6.

Figure 4:
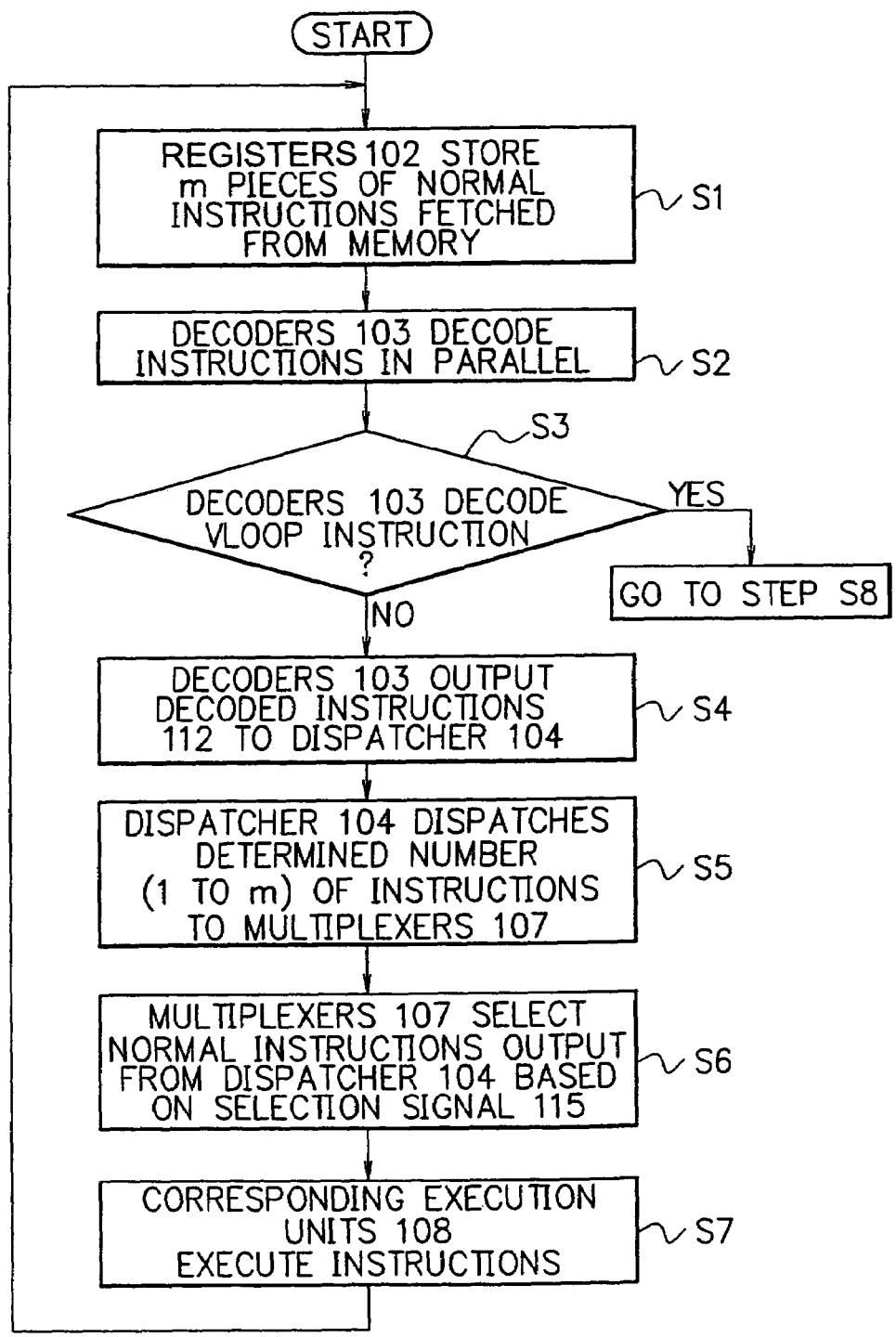
FIG. 4 is a flowchart showing the operation of the parallel computation processor in normal mode.

FIG. 4 is a flowchart showing the operation of the parallel computation processor in the normal mode before the instruction decoders 103 decode the VLOOP instruction. The write enable signal 113 and dispatch selection signal 115 are negated during the normal mode. First, m pieces of normal instructions fetched from the instruction memory via the instruction bus 101 are written to the instruction registers 102 (step S1). The m pieces of normal instructions are read out of the registers 102, and decoded by the instruction decoders 103 in parallel (step S2).

Incidentally, a description will be given later of the operation (step S3/YES) for the occasion when the VLOOP instruction is decoded and the operation mode is switched to the initial VLOOP mode.

Having decoded the normal instructions, the instruction decoders 103 send decoded instructions 112 to the instruction dispatcher 104 (step S4). The instruction dispatcher 104 subsequently dispatches the determined number (a number between 1 and m) of decoded normal instructions to the multiplexers 107 (step S5). The multiplexers 107 select the normal instructions dispatched from the dispatcher 104 based on the dispatch selection signal 115 (step S6). After that, corresponding units out of n pieces of the execution units 108 execute the normal instructions sent from the multiplexers 107 (step S7).

Figure 5:
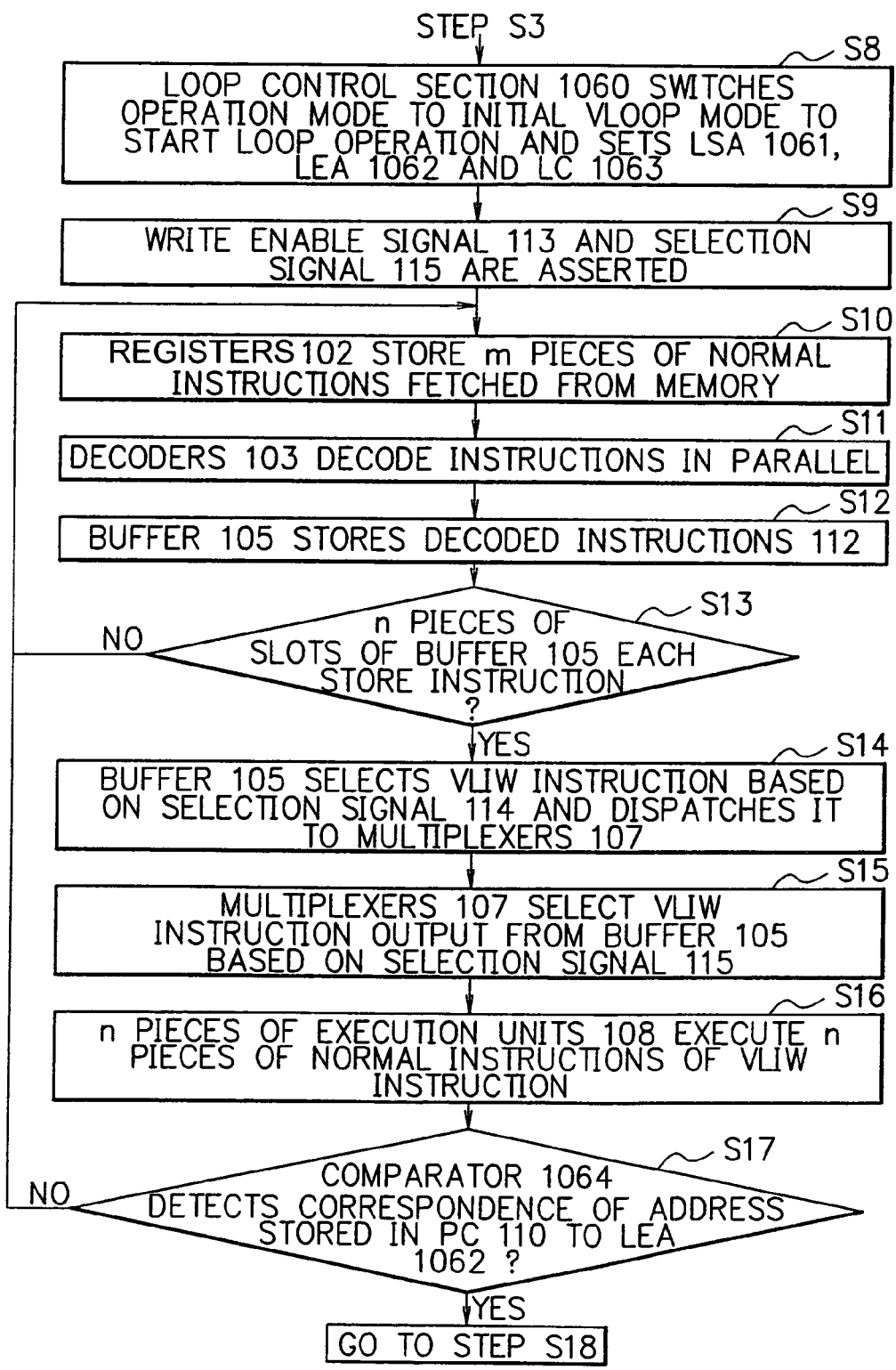
FIG. 5 is a flowchart showing the operation of the parallel computation processor in initial VLOOP mode.

FIG. 5 is a flowchart showing the operation of the parallel computation processor in the initial VLOOP mode. When the instruction decoders 103 decode the VLOOP instruction while a program is run in the normal mode (step S3/YES), the VLOOP decode signal 111 is asserted. In response to the assertion of the signal 111, the loop control section 1060 switches the operation mode to the initial VLOOP mode to start loop operation. Besides, the loop control section 1060 assigns the address next to the address of the VLOOP instruction, LSA+VNUM*n, and VLC for the LSA 1061, LEA 1062 and LC 1063, respectively (step S8).

In the initial VLOOP mode, the write enable signal 113 and dispatch selection signal 115 are asserted (step S9). Then, m pieces of normal instructions fetched from the instruction memory via the instruction bus 101 are written in the instruction registers 102 (step S10). The m pieces of normal instructions are read out of the registers 102, and decoded by the instruction decoders 103 in parallel (step S11). Having decoded the normal instructions, the instruction decoders 103 send m pieces of decoded instructions 112 to the instruction buffer 105 to write the instructions 112 therein (step S12). This procedure is repeated with respect to a series of normal instructions. Consequently, the decoded normal instructions are stored in n pieces of storage slots INSTi-1 to INSTi-n (i denotes a row number) of the instruction buffer 105. When n pieces of normal instructions for one VLIW instruction have been stored (step S13/YES), the instruction buffer 105 selects the VLIW instruction according to the read selection signal 114 to dispatch it to the multiplexers 107 (step S14). The multiplexers 107 select the VLIW instruction dispatched from the buffer 105 based on the dispatch selection signal 115 (step S15). Subsequently, n pieces of the execution units 108 execute the VLIW instruction composed of n pieces of normal instructions (step S16). In the initial VLOOP mode, when the comparator 1064 detects that the instruction address stored in the PC 110 corresponds to the LEA 1062 (step S17), that is, the program has been executed through to the VLIW instruction at the LEA, the loop control section 1060 decrements the loop repeat count (LC 1063). The loop control section 1060 then assigns the LSA 1061 for the instruction address stored in the PC 110 so that program execution branches from the VLIW instruction at the loop end to the one at the LSA (step S18). After that, the operation mode is switched to the VLOOP mode.

Figure 6:
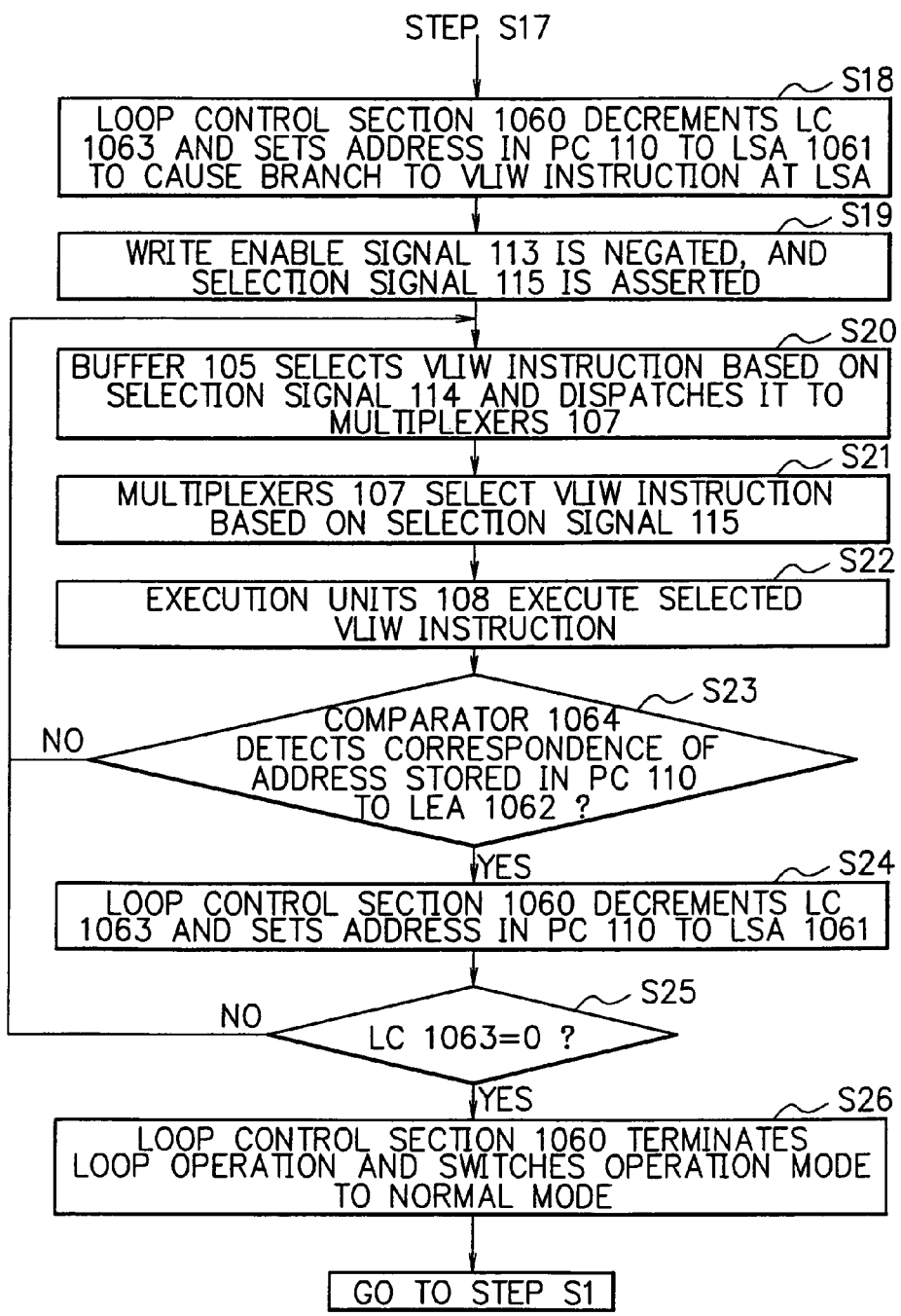
FIG. 6 is a flowchart showing the operation of the parallel computation processor in VLOOP mode.

FIG. 6 is a flowchart showing the operation of the parallel computation processor in the VLOOP mode. The write enable signal 113 is negated, and dispatch selection signal 115 is asserted during the VLOOP mode (step S19). Accordingly, the instruction buffer 105 is not to be written. The instruction buffer 105 selects a VLIW instruction from the VLIW routine according to the read selection signal 114 to dispatch it to the multiplexers 107 (step S20). The multiplexers 107 select the VLIW instruction based on the dispatch selection signal 115 (step S21). Subsequently, the execution units 108 execute the VLIW instruction (step S22). This procedure is repeated until the comparator 1064 detects that the instruction address stored in the PC 110 corresponds to the LEA 1062. When the address in the PC 110 corresponds to the LEA 1062 (step S23), the loop control section 1060 decrements the LC 1063, and assigns the LSA 1061 for the instruction address stored in the PC 110 so that program execution branches from the VLIW instruction at the loop end to the one at the LSA (step S24). The loop is executed repeatedly until the LC 1063 is counted down to 0. When the LC 1063 stands at 0 (step S25/YES), the loop control section 1060 terminates the loop operation as the VLIW routine has been executed prescribed number of times. After that, the operation mode is switched to the normal mode (step S26).

As is described above, even though overhead is incurred in the initial VLOOP mode since instructions cannot be executed until n pieces of normal instructions are stored to form a VLIW instruction, the VLIW instructions otherwise can be executed repeatedly in each cycle with little overhead.

Incidentally, the parallel computation processor of the present invention can be realized by a computation control program to control the loop control unit 106 according to the steps in the flowcharts illustrated in FIGS. 4 to 6. In other words, the processor is realized with the control program that controls the loop control unit 106 so that instructions are stored in the instruction buffer 105, instructions are dispatched from the buffer 105, and instructions dispatched from the instruction dispatcher 104 or those from the buffer 105 are selectively executed.

As set forth hereinabove, in accordance with the present invention, the parallel computation processor enables the execution units built therein to maximize their processing power in loop operation. Moreover, since there is little overhead in the execution sequence of loop operation, high-speed loop operation can be performed.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. A parallel computation processor comprising:
an instruction bus for simultaneously fetching m instructions from an instruction memory, wherein m is an arbitrary natural number;
instruction registers for storing the m instructions;
instruction decoders for concurrently decoding the m instructions read out of the instruction registers;
an instruction dispatcher for simultaneously dispatching the m instructions decoded by the instruction decoders;
an instruction buffer for storing the decoded instructions, and simultaneously dispatching n decoded instructions, wherein n is an arbitrary natural number larger than m;
a loop control unit for controlling an execution sequence of loop operation and storing and dispatching of decoded instructions carried out in the instruction buffer;
multiplexers for selecting either the m decoded instructions dispatched by the instruction dispatcher or the n decoded instructions dispatched by the instruction buffer under control of the loop control unit; and n execution units for executing the decoded instructions in parallel.

2. The parallel computation processor claimed in claim 1, wherein the loop control unit controls operations including:
  initiating storing of the n decoded instructions in the instruction buffer by decoding an instruction that declares a start of loop operation;
  dispatching n decoded instructions in parallel each time n decoded instructions are stored in the instruction buffer; and
  repeating the parallel dispatch of the n decoded instructions stored in the instruction buffer during repetitive loop operation after all decoded instructions comprised in a loop have been stored in the instruction buffer.

3. A computation control method applied to a parallel computation processor which decodes m instructions simultaneously read out of an instruction memory, wherein m is an arbitrary natural number, and dispatches the m decoded instructions in parallel via an instruction dispatcher to execute operations specified by the m decoded instructions by any of n execution units, wherein n is an arbitrary natural number larger than m, comprising the steps of:
  initiating storing of the n decoded instructions in an instruction buffer by decoding an instruction that declares a start of loop operation;
  dispatching n decoded instructions in parallel each time n decoded instructions are stored in the instruction buffer;
  concurrently executing operations specified by the n decoded instructions by the n execution units; and
  executing the parallel dispatch and execution of the n decoded instructions repeatedly after all decoded instructions comprised in a loop have been stored in the instruction buffer.

4. A computation control program adopted in a parallel computation processor which decodes m instructions simultaneously read out of an instruction memory, wherein m is an arbitrary natural number, and dispatches the m decoded instructions in parallel via an instruction dispatcher to execute operations specified by the m decoded instructions by any of n execution units, wherein n is an arbitrary natural number larger than m, for controlling the operations of:
  initiating storing of the decoded instructions in an instruction buffer by decoding an instruction that declares a start of loop operation;
  dispatching n decoded instructions in parallel each time n decoded instructions are stored in the instruction buffer;
  concurrently executing operations specified by the n decoded instructions by the n execution units; and
  executing the parallel dispatch and execution of n decoded instructions repeatedly after all decoded instructions comprised in a loop have been stored in the instruction buffer.

* * * * *